Sept. 23, 1969  K. R. BROWN ET AL  3,468,019
METHOD OF MAKING SLOT CLOSERS FOR SMALL MOTORS
Filed April 20, 1967

Inventors
K. R. BROWN
B. C. McDERMOTT
By
Cameron, Kerkam + Sutton
Attorneys

United States Patent Office
3,468,019
Patented Sept. 23, 1969

3,468,019
METHOD OF MAKING SLOT CLOSERS FOR SMALL MOTORS
Kenneth Robson Brown, Kirknewton, Midlothian, and Bernard Colin McDermott, Edinburgh, Scotland, assignors to Ferranti, Limited, Hollinwood, Lancashire, England, a company of Great Britain and Northern Ireland
Filed Apr. 20, 1967, Ser. No. 632,404
Claims priority, application Great Britain, Apr. 20, 1966, 17,213/66
Int. Cl. H02k 15/00
U.S. Cl. 29—596                    2 Claims

ABSTRACT OF THE DISCLOSURE

Means for reducing the width of the mouth of a winding slot in the rotor or stator of a dynamo-electric machine comprises closing the slot with an arcuate member of magnetic material and subsequently removing the crown of the arcuate member to form a slot mouth of the required width.

---

This invention relates to dynamo-electric machines.

It is well known in the construction of electric motors and the like to place the conductors of a winding in slots formed in the rotor or stator core. It is necessary to provide means for closing the mouth of each slot in order to keep the conductors in position. This is normally done by making the slot mouth narrower than the slot itself so that a strip of insulating material may be retained in the slot between the winding and the slot mouth to hold the conductors in position. The width of the slot mouth is important not only for this reason, but also because of its effect on the magnetic field produced by the winding. For maximum efficiency the slot mouths have a critical width.

In some cases, especially where the machine is of small dimensions, it is necessary to make the slot mouth wider than this critical valve in order to place the conductors in the slot. This may create two difficulties, that of retaining the conductors in the slot and that of maintaining the required magnetic characteristics.

According to the present invention there is provided a method of reducing the width of the mouth of a winding slot in the rotor or stator of a dynamo-electric machine, which includes inserting into the slot in the region between the winding and the mouth thereof a slot-closing member of magnetic material of substantially arcuate cross-section the shape of which is such as to make good magnetic contact with the sides of the slot, and removing the crown of the slot-closing member to form a slot mouth of the required width.

An embodiment of the invention will now be described with reference to the accompanying drawings, in which.

Figure 1:
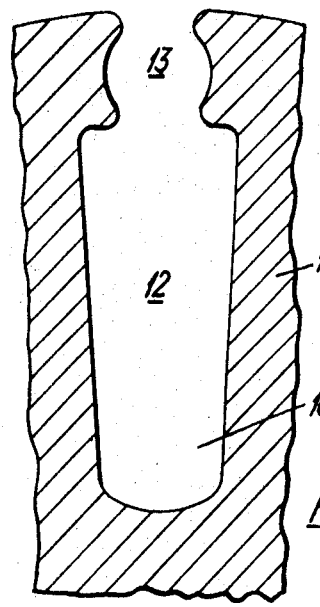
FIGURE 1 shows, in section, part of a rotor core for a non-salient-pole dynamo-electric machine including one winding slot.

Referring now to FIGURE 1, a number of winding slots 10, only one being shown, are formed in a laminated iron core 11. Each slot consists of a body portion 12 for containing the conductors of a winding, and an open end 13 through which the conductors are inserted into the slot. The mouth of the slot is assumed to be larger than the optimum value for the required magnetic efficiency of the machine. The open end of the slot is of generally cylindrical section as shown.

Figure 2:
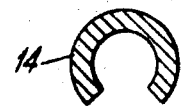
FIGURE 2 shows in section, a slot-closing member.

Each slot-closing member 14 is of substantially arcuate section as shown in FIGURE 2. These members are made of a magnetic material such as that known as "radiometal," and are formed by bending a strip of the material around a cylindrical mandrel. The dimensions of the slot-closing members are such that they may be inserted into the open end 13 of each slot 10 from either end, and are retained in that position by the resilience of the material.

Figure 3:
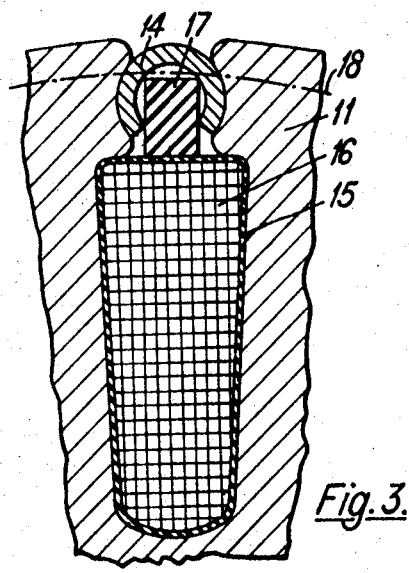
FIGURE 3 shows the slot of FIGURE 1 with a winding and the slot-closing member in place in the open end of the slot.

FIGURE 3 shows the winding slot 10 with the winding and slot-closing member in position. Before the winding is inserted the slot is lined with a layer of insulating material 15. The conductors 16 of the winding are then inserted, and the insulating material is closed over the top of the winding. The slot-closing member 14 is then inserted into the open end of the slot, and a strip of rigid insulating material 17 is added to prevent the slot-closing member from rotating.

Figure 4:
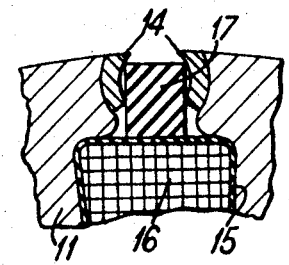
FIGURE 4 shows part of the view of FIGURE 3 after the crown of the slot-closing member has been removed.

In order to produce a slot mouth of the required width, the entire core is machined, preferably by grinding, until the radius is reduced to some line indicated at 18. This operation completely removes the crown of the slot-closing member 14 as shown in FIGURE 4. The width of the mouth formed depends only on the amount of material removed from the core 11 during the machining operation.

The two remaining portions of the slot-closing member 14 are held in position by the strip 17. If required the winding may be impregnated with a suitable resin or similar material for the same purpose.

It will be apparent that the invention is equally applicable to any winding in a dynamo-electric machine which is placed in slots in a core. For example it may be used for winding placed in slots in the pole-pieces of salient-pole machines.

It is not necessary to remove the surface of the entire core in order to produce a new slot mouth of the required width. It is possible to remove only the crown of each slot-closing member to the required extent.

Any suitable metal-removing technique may be used for removing the crown of each slot-closing member.

What we claim is:
1. A method of reducing the width of the mouth of a winding slot in the rotor or stator of a dynamo-electric machine, which includes the steps of inserting into the slot in the region between the winding and the mouth thereof a slot-closing member of magnetic material of substantially arcuate cross-section the shape of which is such as to make good magnetic contact with the sides of the slot, anchoring the slot-closing member against movement relative to the slot, and removing the crown of the slot-closing member to form a slot mouth of the required width.

2. A method as claimed in claim 1 in which the crown of the slot-closing member is removed by machining the surface of the rotor or the stator as the case may be.

References Cited

UNITED STATES PATENTS

| | | | |
|---|---|---|---|
| 984,182 | 2/1911 | Barr | 310—214 |
| 1,042,408 | 10/1912 | Dearborn | 310—214 |
| 1,741,262 | 12/1929 | Wait | 310—214 |
| 2,451,633 | 10/1948 | Perrigo | 310—214 |
| 3,054,009 | 9/1962 | Papst | 310—214 |

JOHN F. CAMPBELL, Primary Examiner

C. E. HALL, Assistant Examiner

U.S. Cl. X.R.
29—598; 310—214